(12) United States Patent
Prins

(10) Patent No.: US 11,905,133 B1
(45) Date of Patent: *Feb. 20, 2024

(54) SYSTEMS AND METHODS FOR BULK MATERIAL LOAD OUT

(71) Applicant: New Vision Co-op, Worthington, MN (US)

(72) Inventor: Grant J. Prins, Iona, MN (US)

(73) Assignee: New Vision Co-op, Worthington, MN (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/374,290

(22) Filed: Jul. 13, 2021

Related U.S. Application Data

(63) Continuation of application No. 16/902,187, filed on Jun. 15, 2020, now Pat. No. 11,059,683.

(51) Int. Cl.
| | |
|---|---|
| *B65G 67/06* | (2006.01) |
| *B65G 33/10* | (2006.01) |
| *B65G 47/19* | (2006.01) |
| *B65G 47/78* | (2006.01) |
| *B65G 11/02* | (2006.01) |
| *B65G 45/00* | (2006.01) |
| *B65G 65/00* | (2006.01) |
| *B01F 27/72* | (2022.01) |

(Continued)

(52) U.S. Cl.
CPC ............. *B65G 67/06* (2013.01); *B01F 27/72* (2022.01); *B01F 35/71775* (2022.01); *B65G 11/026* (2013.01); *B65G 33/10* (2013.01); *B65G 45/005* (2013.01); *B65G 47/19* (2013.01); *B65G 47/78* (2013.01); *B65G 65/005* (2013.01); *A01K 5/007* (2013.01); *A01K 5/0208* (2013.01); *A01K 5/0258* (2013.01); *B01F 2101/18* (2022.01); *B65G 2201/042* (2013.01); *B65G 2814/0344* (2013.01)

(58) Field of Classification Search
None
See application file for complete search history.

(56) References Cited

U.S. PATENT DOCUMENTS

| | | | | |
|---|---|---|---|---|
| 3,155,286 | A | * 11/1964 | Van Peursem | ....... A01K 5/0258 222/64 |
| 3,275,125 | A | * 9/1966 | Prentice | ............... A01K 5/0258 198/671 |

(Continued)

FOREIGN PATENT DOCUMENTS

CN 104355141 A * 2/2015

*Primary Examiner* — William R Harp
(74) *Attorney, Agent, or Firm* — Husch Blackwell

(57) ABSTRACT

A weigh hopper assembly including a plurality of adjacently aligned weigh hoppers connected via a frame, and longitudinal conveyor mechanism extending along a top portion of the weigh hopper assembly. Each weigh hopper has independent load cells in order to individually weigh the material discharged into the weigh hopper. The conveyor mechanism includes a plurality of gates along a bottom surface of the conveyor mechanism, each gate being aligned with a corresponding weigh hopper of the plurality of weigh hoppers. The conveyor mechanism is in turn connected to a plurality of product bins. A top portion of the conveyor mechanism is in communication with a plurality of product bins via a series of inlet chutes and gates. The weigh hoppers are aligned adjacent to each other and spaced so that each weigh hopper aligns with the transport vehicle.

19 Claims, 5 Drawing Sheets

(51) Int. Cl.
  *B01F 35/71* (2022.01)
  *A01K 5/00* (2006.01)
  *A01K 5/02* (2006.01)
  *B01F 101/18* (2022.01)

(56) References Cited

U.S. PATENT DOCUMENTS

| | | | | |
|---|---|---|---|---|
| 3,685,602 | A * | 8/1972 | Mayer | G01G 19/22 |
| | | | | 177/210 R |
| 3,822,056 | A * | 7/1974 | Hawes, Jr. | B01F 35/88 |
| | | | | 366/182.2 |
| 3,944,090 | A * | 3/1976 | Flood | B65G 67/04 |
| | | | | 198/569 |
| 3,959,636 | A * | 5/1976 | Johnson | B29B 7/78 |
| | | | | 177/25.14 |
| 4,460,308 | A * | 7/1984 | Moon | G01G 15/00 |
| | | | | 414/329 |
| 4,832,204 | A * | 5/1989 | Handy | B07C 3/00 |
| | | | | 209/3.3 |
| 5,035,294 | A * | 7/1991 | Volk, Jr. | G01G 13/003 |
| | | | | 177/255 |
| 5,052,811 | A * | 10/1991 | Akatsu | B01F 35/881 |
| | | | | 366/156.1 |
| 5,087,864 | A * | 2/1992 | Abel | G01G 19/303 |
| | | | | 177/121 |
| 5,143,166 | A * | 9/1992 | Hough | G01G 19/22 |
| | | | | 177/128 |
| 5,772,390 | A * | 6/1998 | Walker | G01G 13/06 |
| | | | | 222/64 |
| 6,447,674 | B1 * | 9/2002 | Simon | G01G 13/024 |
| | | | | 222/64 |
| 9,745,151 | B2 * | 8/2017 | Martel | G01G 13/024 |
| 11,059,683 | B1 * | 7/2021 | Prins | B01F 35/71775 |

* cited by examiner

SYSTEMS AND METHODS FOR BULK MATERIAL LOAD OUT

RELATED APPLICATION

This application is a continuation of application Ser. No. 16/902,187 filed Jun. 15, 2020, which is hereby fully incorporated herein by reference.

TECHNOLOGICAL FIELD

The invention relates generally to a load out system and methods of loading a vehicle with payload, and more particularly an improved load out system for dry bulk material and methods of loading one or more compartments of a delivery vehicle using a plurality of weigh hoppers for bulk materials that may require identity preservation.

BACKGROUND

In typical feed mill operations, a standard feed mill is equipped with multiple bins that contain finished feed or other payload. Each finished feed bin contains feed ingredients such as grain, vegetable and animal protein meals, minerals, vitamins, trace minerals and medications that are used in combination to manufacture finished feed to customer specifications. In one example, a feed mill can include 18 separate finished feed bins, arranged in any of a variety of configurations, such as for example, two columns of nine bins each, aligned side by side. However, more or less bins can be contemplated depending on the size and structure of the feed mill.

The feed mill is equipped with a loading area, in which a suitable delivery conveyance enters and is loaded with the finished feed. Suitable conveyance can be any vehicle or vessel, such as a semi-tractor with a feed trailer or truck with a feed body, or rail car or boat, with or without compartmentalized storage bodies or other vessel for hauling the particulate materials from the mill or processing site to a desired delivery location or several locations. Upon entering the loading area of the feed mill, a semi-tractor with the trailer is positioned beneath the bins and receives the finished feed held from one, or more, of the bins above. Because customer orders often include more than one product and/or a single trailer has capacity to carry multiple customer orders, the trailer is typically separated into a plurality of compartments for carrying different products to different delivery locations. The multiple compartments are used to isolate each product and to avoid cross contamination of materials during transport.

In a typical load out system, a mobile loading scale, otherwise known as a weigh hopper or hopper scale, including one or more load cells, is located below the storage bins and is supported by a rail, or other track system below the matrix of storage bins. During a load out process, the mobile loading scale travels along the rail or track system to a bin containing the desired product. Once the mobile loading scale is positioned below the desired bin, product is discharged from the bin into the mobile loading scale until a desired weight of the product corresponding to each customer order, is in the mobile loading scale. The mobile loading scale then travels on a track to the appropriate compartment of the trailer, a hydraulic, electric or pneumatic gate positioned at the bottom end of the mobile loading scale is opened, and the weighed product is discharged into the compartment of the trailer. Once emptied, the mobile loading scale traverses the track and returns to the same bin if like product remains, or the next desired bin, and the mobile loading scale repeats the process, traversing back and forth until the compartments of the trailer are filled with product corresponding to the customer order(s). In operation, the load out process is time consuming due to the need for the mobile loading scale to traverse the track repeatedly in order for the compartments of the transportation vehicle to be filled in series and material weighed. This load out process can be one throughput limiting factor of the mill because it limits how many customer orders can be processed and shipped out daily. There remains a need for a higher throughput load out process, while minimizing the occurrence of cross contamination.

SUMMARY

According to embodiments of the present disclosure, a load out system replaces the mobile loading scale, its support structure, and transport method by including a weigh hopper assembly, including a plurality of adjacently aligned weigh hoppers connected via a frame, and longitudinal conveyor mechanism extending along a top portion of the weigh hopper assembly. Each weigh hopper has independent load cells in order to individually weigh the material discharged into the weigh hopper. The conveyor mechanism includes a plurality of gates along a bottom surface of the conveyor mechanism, each gate being aligned with a corresponding weigh hopper of the plurality of weigh hoppers. The conveyor mechanism is in turn connected to a plurality of product bins. A top portion of the conveyor mechanism is in communication with a plurality of product bins via a series of inlet chutes and gates. The weigh hoppers are aligned adjacent to each other and spaced so that each weigh hopper aligns with the transport vehicle and in any configuration.

In embodiments, the conveyor mechanism comprises a longitudinal screw feeder positioned within a housing or trough. The screw feeder has tight tolerances with minimal clearance within the housing to minimize product buildup within the housing. In other embodiments, the conveyor mechanism can comprise a conveyor belt or belts, a conveyor chain, a plunger system, or any of a variety of mechanism for moving product through the housing and to the desired weigh hopper.

The system further comprises access to a flush bin for containing an inert flushing material, such as ground corn. The flush bin is in communication with the top surface of the conveying system via an inlet chute and gate at the same end as the flush bin. The flush discharge hopper is mounted to an end of the conveyor mechanism.

In use, products stored in the plurality of bins of the feed mill are conveyed individually to each of a plurality of weigh hoppers, as determined by the customer order(s). Once all (or as many as needed) of the weigh hoppers are filled, the trailer is positioned below the plurality of weigh hoppers. The gates of the loaded weigh hoppers are opened either simultaneously or in series and weigh hopper product flows into the individual trailer compartments by gravity. This allows for efficient loading of the compartmentalized trailer of the vehicle or other means of conveyance, thereby enhancing the efficiency of the load out process. In certain embodiments, load out time can be substantially reduced, such as by 50% or more. In one particular embodiment, load out time can be reduced by 90% or more of load out time using a conventional mobile loading scale, such as a weigh lorry.

The above summary of the invention is not intended to describe each illustrated embodiment or every implementation of the present invention. The detailed description and claims that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

DETAILED DESCRIPTION

Figure 1:
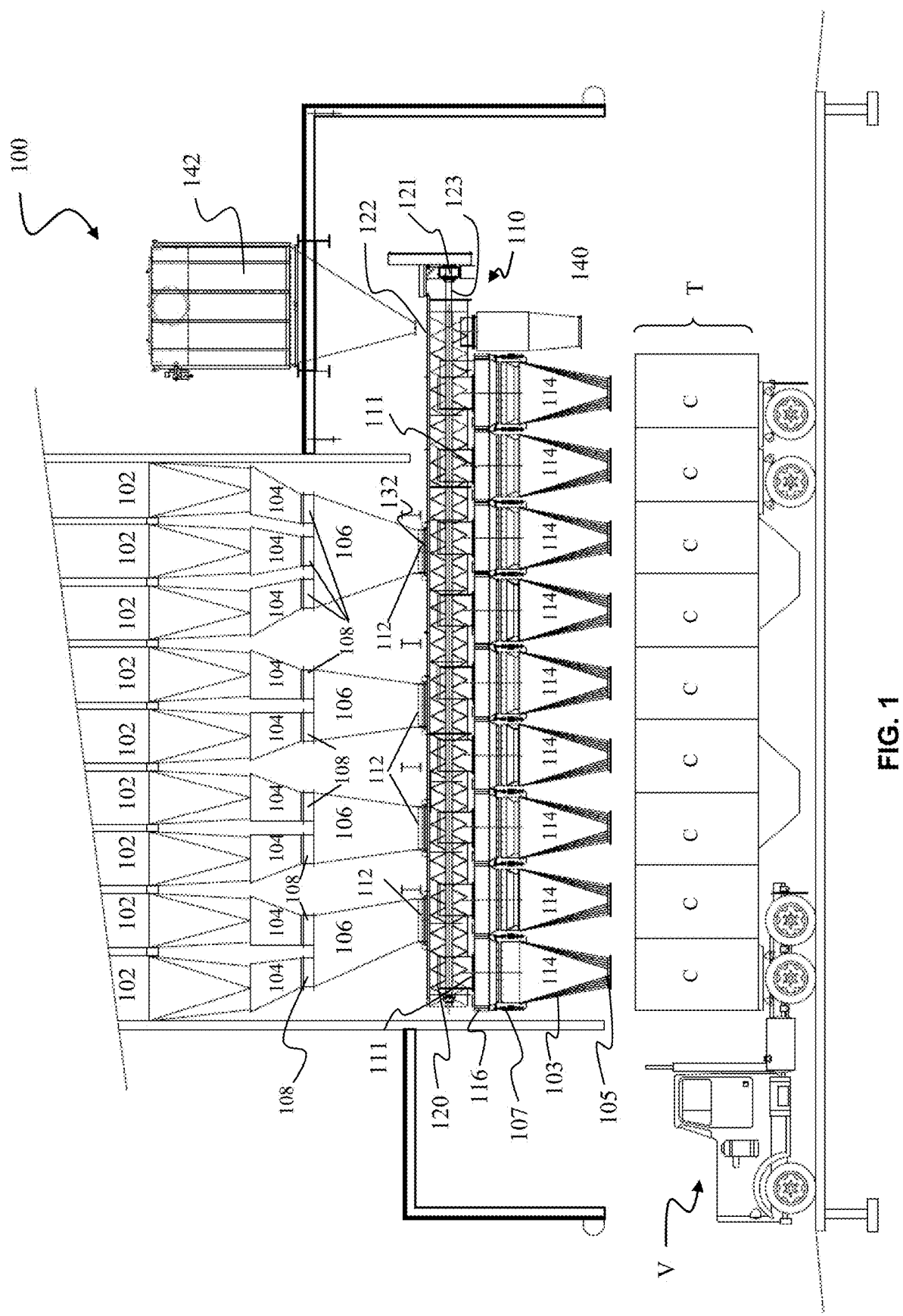
FIG. 1 is a front elevational view of a load out system and transport vehicle according to an embodiment of the invention.

According to embodiments, and referring to FIGS. 1 and 2a-2d, a load out system structure 100 generally includes:

a plurality of storage bins 102 (see FIG. 1) for storing bulk material;

a first plurality of collection chutes 104 (see FIG. 1), each chute 104 being in communication with a bin 102 for transferring material stored in bin 102;

a second plurality of collection chutes 106 (see FIG. 1), each chute 106 being in communication with one or more of chutes 104 for transferring material from chutes 104 to chutes 106;

a plurality of flow control gates 108 (see FIG. 1) to control flow through 104 chutes into chutes 106;

a longitudinal conveyor mechanism 110 (see FIG. 1) for mixing and conveying bulk material from one or more bins 102; a plurality of flow control gates 112 (see FIG. 1) to control product flow through chutes 106 into conveyor mechanism 110;

a plurality of adjacently aligned weigh hoppers 114 (see FIG. 1), each weigh hopper 114 having a load cell assembly 107 mounted thereto; and a structural frame 116 (see FIGS. 1, 2a, and 2c) which provides a common connection point form conveyor mechanism 110 and weigh hoppers 114.

Figure 3:
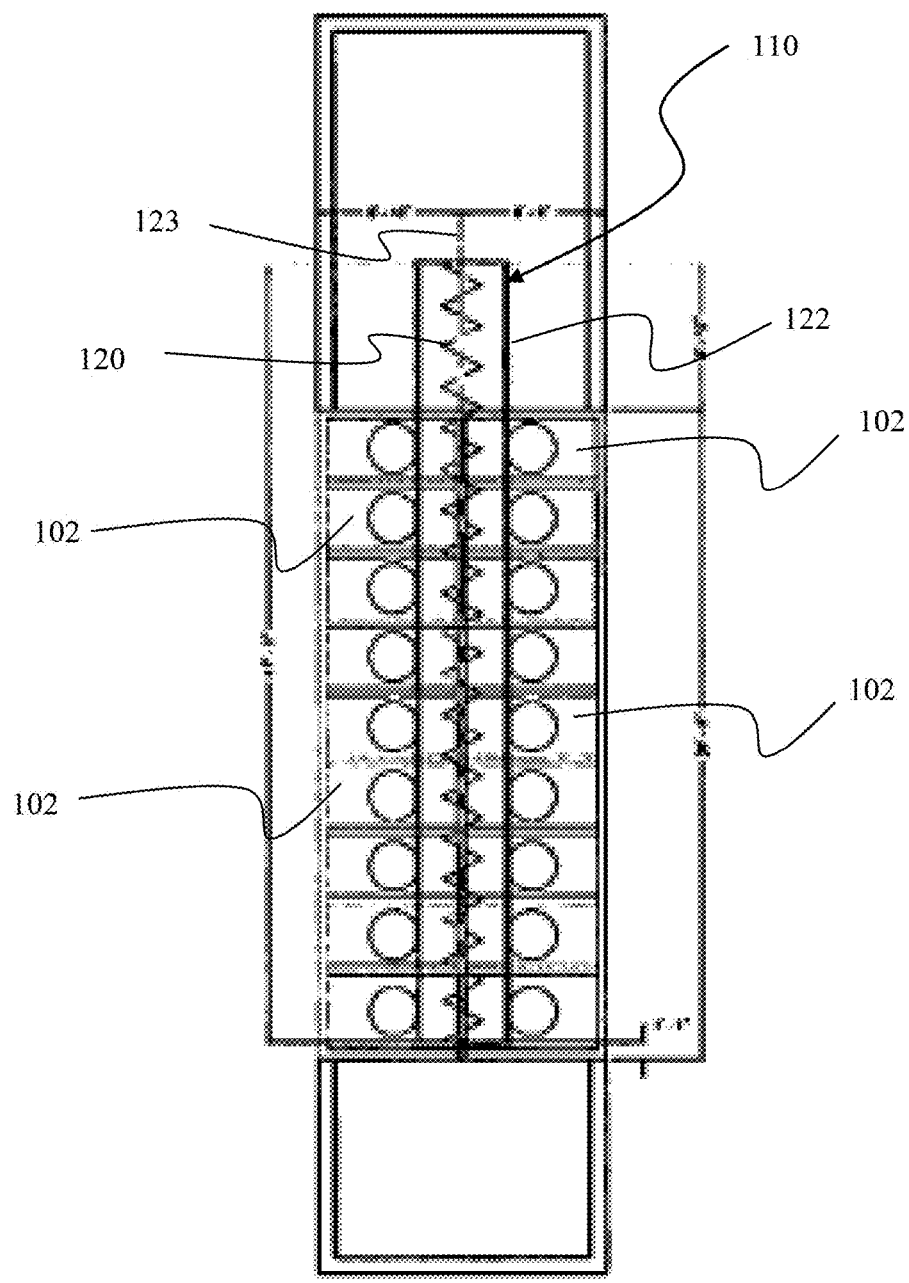
FIG. 3 is a top cross sectional view of product bins and a conveyor mechanism according to an embodiment of the invention.

Referring to FIGS. 1 and 3, in a non-limiting embodiment, bins 102 are arranged in one or more columns, for example, but not limited to, two columns of nine for a total of 18 product bins. However, any of a variety of bin configurations can be contemplated. In the embodiment depicted in FIG. 1, each outlet chute 106 is connected to more than one bin 102 via a series of gates 108 and chutes 104. For example, product bins 102 can be grouped and connected via chutes 104 and gates 108 to a single chute 106 based on similarity in product, and where cross contamination is of minimal concern. In other embodiments each individual bin 102 is connected to conveyor mechanism 110 via an individual chute. Any product in any quantity from bin 102 can be distributed through its discharge or collection chute 104, gate 108, chute 106, and gate 112, then into conveyor mechanism 110 and distributed for certified, commercial weighment into hoppers 114, and loaded into the waiting delivery conveyance vehicle V.

Referring now to FIGS. 2a-2d, weigh hoppers 114 are configured in an alignment adjacent to each other and spaced along frame 116 (FIGS. 2a & 2b) so that each weigh hopper 114 aligns with transport vehicle V when positioned in the load area. In one embodiment in which transport vehicle includes a plurality of compartments C of a trailer T, each weigh hopper 114 aligns with a single compartment C of a compartmentalized trailer T of a transport vehicle V when the vehicle V is positioned in the system 100, as most clearly depicted in FIG. 1. However, it can be contemplated that vehicle V has a trailer with no compartments (not shown).

Figure 2B:
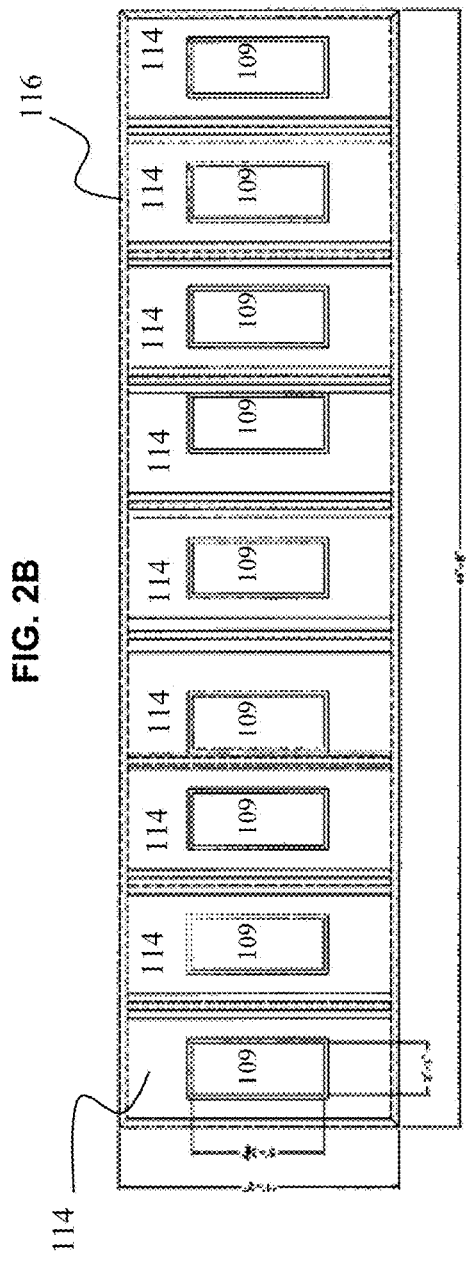
FIG. 2B is a top view of the weigh hopper assembly of FIG. 2A.
Figure 2A:
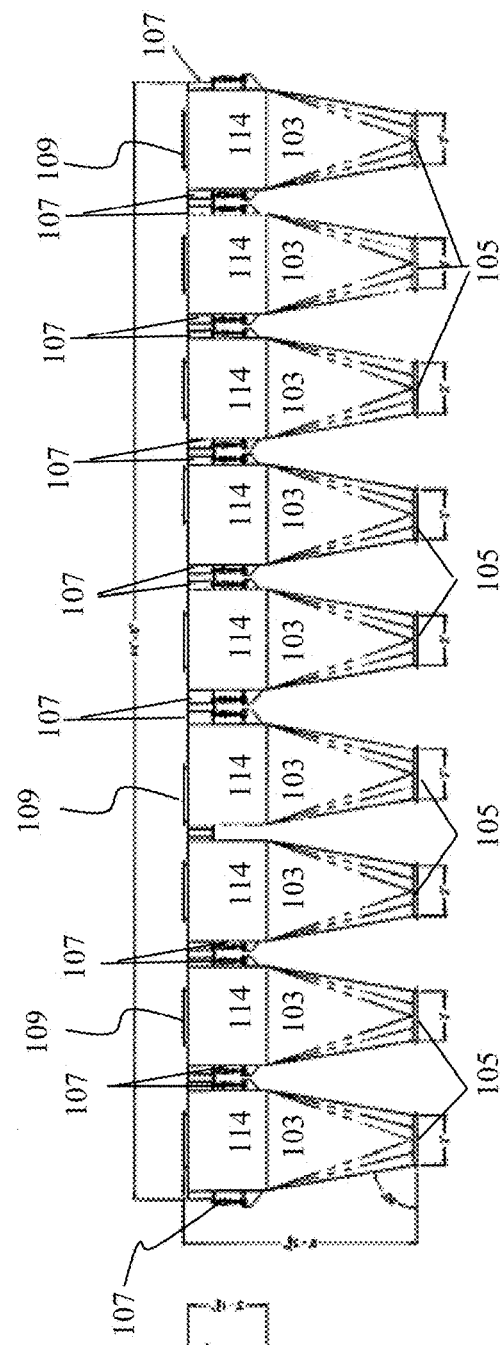
FIG. 2A is a front elevational view of a weigh hopper assembly according to an embodiment of the invention.
Figure 2C:
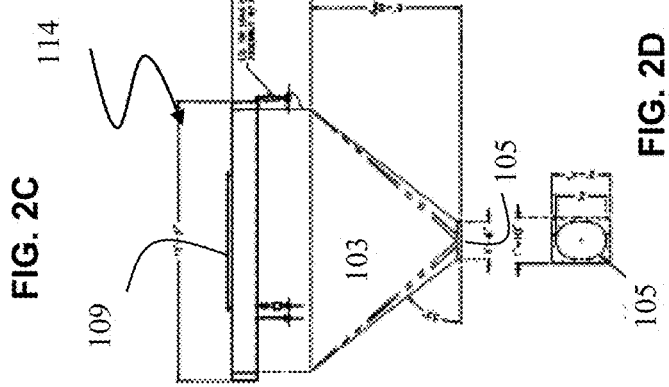
FIG. 2C is a side view of a weigh hopper of the weigh hopper assembly of FIG. 2B.

As depicted in FIGS. 2a and 2c, each weigh hopper 114 has a longitudinally tapered discharge section 103 which terminates at a gate 105 at a bottom portion, and, as depicted in FIGS. 2b and 2c, a top portion of each hopper 114 includes structure defining an opening 109 in communication with conveyor assembly 110. Referring now to FIG. 2a, each weigh hopper 114 includes a load cell assembly 107 mounted thereto for individual weighing or metering of material discharged into the weigh hopper 114.

Figure 2D:
FIG. 2D is a bottom view of the weigh hopper gate of FIG. 2A

Referring to FIGS. 1, 2a, and 2d, gate 105 can comprise a hopper gate, such as a hydraulic, electric or pneumatic (air) gate, that controls the flow of weighed product from hopper 114 into trailer T generally, or an individual compartment C (as depicted in FIG. 1) and is known to those of ordinary skill in the art.

Weigh hoppers 114 can be formed of any suitable material such as, for example, stainless steel, composite materials, reinforced plastic materials, or combinations thereof. Weigh hoppers 114 can optionally include baffles or vibrating mechanisms to aid in discharging product therefrom.

Referring back to FIG. 1, conveyor mechanism 110 includes a plurality of flow control gates 111, each gate 111 being aligned with a corresponding opening 109 (FIG. 2b.) of a weigh hopper 114 (FIG. 2a) of the weigh hopper assembly 102. The conveyor mechanism 110 is, in turn, connected to the plurality of product bins 102 via chutes 104 and 106, and gates 108 and 112, as described previously.

In a non-limiting embodiment and referring to FIGS. 1, 3, and 4, the conveyor mechanism 110 comprises a longitudinal screw feeder 120 positioned within a housing 122. The screw feeder 120 includes a motor 121 and rotating shaft 123 in the form of an auger gear. The screw feeder 120 is sized such that it has tight tolerances with minimal clearance within the housing 122 to ensure that product build up within the housing 122 is minimized, and maximum product is conveyed through the housing 122 to the desired weigh hopper 114.

Figure 4B:
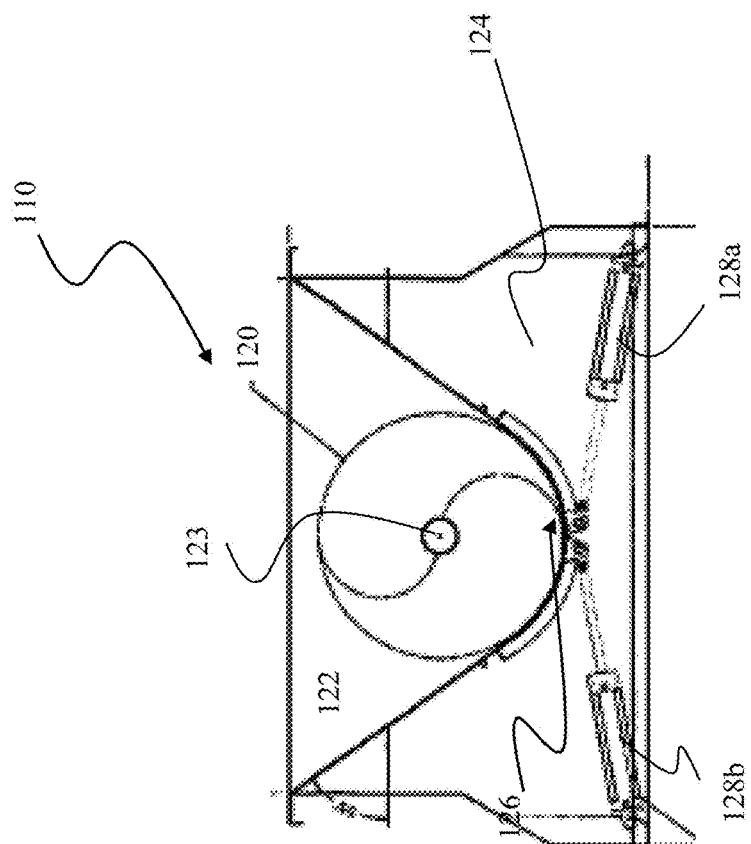
FIG. 4B is a side elevational view of the conveyor mechanism with the trough gate in a closed position according to an embodiment of the invention.
Figure 4A:
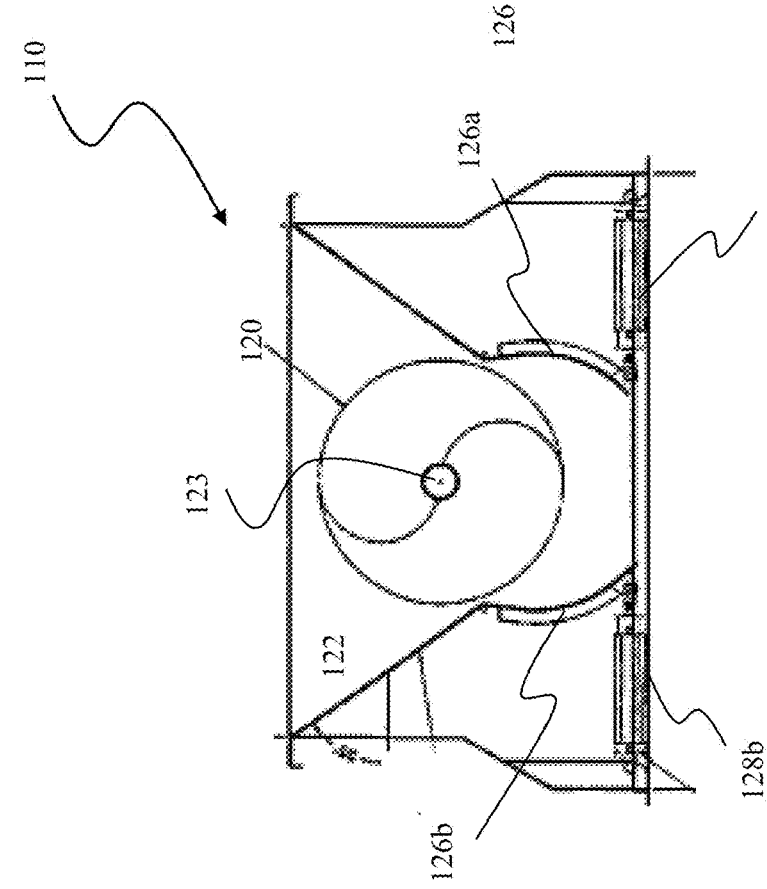
FIG. 4A is a side elevational view of the conveyor mechanism with the trough gate in an open position according to an embodiment of the invention.

In one particular embodiment, and referring to FIGS. 4a and 4b, the conveyor mechanism 110 includes housing 122 in the form of a trough having an arcuate bottom surface 124 structured to define a gate design, and a screw feeder 120 which is sized to fit within the bottom of the arcuate bottom surface 124. Bottom surface 124 includes a plurality of gates 126 in the form of pairs of hinged doors 126a and 126b along its length. Each pair 126a, 126b is positioned over a corresponding opening 109 (FIG. 2b.) of a weigh hopper 114. Each pair 126a, 126b includes an actuator 128a, 128b, such as a hydraulic, electric or pneumatic telescoping cylinder, configured to open the doors 126a, 126b for discharge of material into the corresponding weigh hopper 114', and to close the doors 126a, 126b.

In other embodiments (not shown), the conveyor mechanism 110 can comprise a conveyor belt or belts, a conveyor chain, a plunger system, or any of a variety of mechanism for moving product through the housing and to the desired weigh hopper. In other embodiments, the gate design can comprise a pneumatic or hydraulic hopper gate similar to gates 105 of weigh hoppers 114.

In embodiments and referring back to FIGS. 1 and 3, a top surface of the conveyor mechanism housing 122 includes structure forming a series of openings 132 in communication with gates 112.

Referring again to FIG. 1, system 100 can optionally include access to flush material stored in one or more bins 112, the flush material being an inert material such as ground corn that can be introduced into the screw conveyor 104 for clearing or cleaning a bulk material therefrom. The flush can optionally discharge through the flush discharge spout 140 or into a delivery vehicle of like product. A flush bin is in communication with the conveyor mechanism 110, similar to bins 112 described above. This system minimizes occurrences of cross contamination of otherwise sensitive materials. For example, feed production and loading sequencing may require flushes of inert material between different species and medications. Instead, flushing the conveyor system with an inert, inexpensive product, such as ground corn feed, has little to no cross contamination effect and is standard industry protocol.

Referring to FIG. 1, system 100 can also optionally include an air system 142, with optional capabilities to impart airflow through conveyor mechanism 110 and/or hoppers 114 and/or spout 140.

In use, the load out system according to embodiments efficiently loads a vehicle with one or more bulk materials from a mill, such as a feed mill, or other plant loading bulk material for transport.

Figure 5:
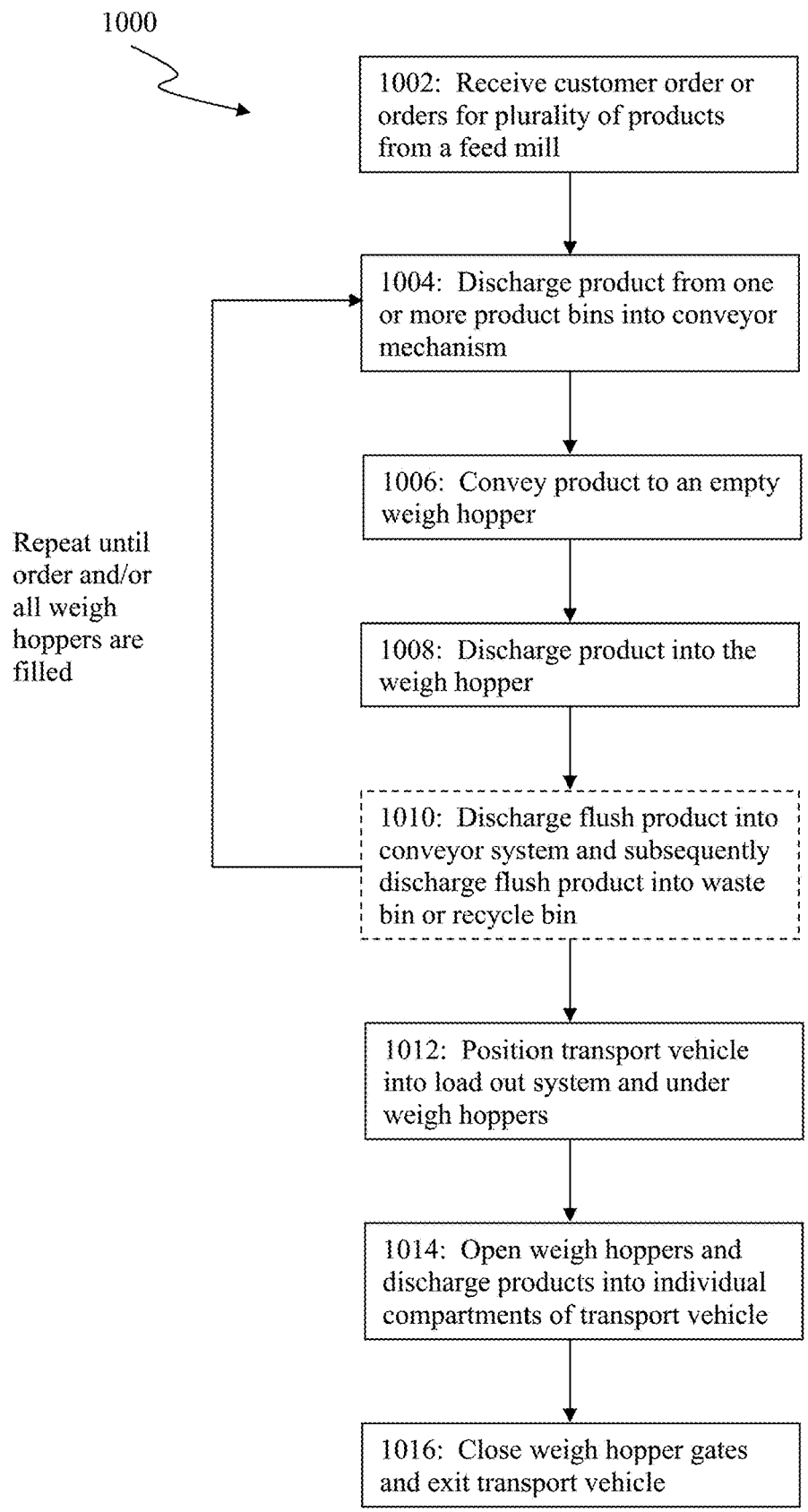
FIG. 5 is a process flow diagram according to an embodiment of the invention. While embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

According to a non-limiting embodiment and referring to FIG. 5, a method 1000 of performing a product load out starts at 1002 with receipt of a customer order or orders containing desired quantities of different products.

Once the feed mill receives the ration and order(s), at 1004 a first product is discharged from one or more of the bins into the conveyor system and delivered in the feed mixer. In one embodiment, the first product comes from an individual bin. In another embodiment, the first product comprises a blend in which material from more than one bin are discharged into the conveyor and mixed. For example, a feed ration can be manufactured with one or more ingredients, minerals, vitamins, nutrients and/or medicants, multiple feed products or grain.

At 1005, the product is mixed. After all product is mixed, the feed ration manufacturing is complete and discharged into conveyance and placed in bins 114 for eventual shipment according to quantity, sequencing restrictions and available transportation, as will be described in more detail.

At 1006, after a first product from storage bin(s) (102) is mixed, the product is conveyed to an empty weigh hopper (112).

At 1008, a first gate (1266) of the conveyor system (104) positioned over the first weigh hopper (114) is opened so that the first product is discharged into the first weigh hopper (114) until a desired weight of the first product is met. Gate 126 is then closed. Material is released from bin(s) 102 following the same pathway through any plurality of bins.

At 1010, a bin 102 containing flush material is then opened as needed to discharge an amount of flushing material which is conveyed through the conveyor system, and then subsequently discharged into a waste bin, or returned to the load if like product.

The steps 1004-1008, and optionally 1010, is repeated and a second product is discharged from a second or one or more bins (112) (or in some instances, the first product from the first bin(s) again if additional product volume is required for the order), conveyed to a second weigh hopper, discharged into the second weigh hopper, etc. The process is repeated until each of the weigh hoppers are filled with the requested weight of product.

At 1012, a vehicle, such as a semi-truck, a rail car, a boat or vessel, or the like, enters into the feed mill and into the load out area. A trailer, truck body or rail car of the vehicle is positioned underneath the plurality of weigh hoppers such that each weigh hopper is positioned over the vehicle or the vehicle's compartments, if it's compartmentalized At 1014, the plurality of weigh hoppers are opened, either simultaneously, sequentially, or combinations thereof (e.g. the ends hoppers are opened simultaneously, while the other hoppers are opened in series) to discharge the various products into each of the compartments (if present) of the trailer.

At 1016, the weigh hoppers are closed and the vehicle leaves the load out area. The process 1000 is repeated as many times as necessary for the feed mill to process all orders.

The systems and methods according to embodiments allow for efficient loading of compartmentalized trailers or vessels of transport vehicles, thereby enhancing the efficiency of the load out process and the number of orders processed in a day to maximize the productivity and throughput of the feed mill. In certain embodiments, load out time is reduced by one-third, more particularly by one-half, even more particularly by two-thirds, and even more particularly by three-quarters compared to traditional load out systems that have a single weigh hopper.

The systems and methods of the embodiments can utilize any of a variety of automated and/or manual systems. For example, a customer order can be processed by computer, and the load out system can be automatically programmed to fill the plurality of weigh hoppers. Alternatively, an operator can manually control the system. In even further embodiments, a customer order is processed by entering in the desired products and quantities and/or by scanning a barcode, QR code, or other order recognition process, and then the system automatically loads the weigh bins according to the order.

The embodiments are not limited to feed mills but can also be used for any of a variety of particular dry bulk material or liquid products to be loaded into compartmentalized vehicles.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A load out system for loading bulk material into a transport vehicle, the system comprising:
   a plurality of storage bins, each bin being configured to contain a bulk material;
   a weigh hopper assembly including a plurality of adjacently arranged weigh hoppers mounted to a frame, each weigh hopper
   having a load cell assembly, wherein the weigh hoppers are arranged such that each weigh hopper is configured to be positioned over the transport vehicle; and
   an elongate conveyor mechanism in communication with each bin of the plurality of storage bins and the weigh hopper assembly,
   wherein the conveyor mechanism is configured to convey bulk material from at least one storage bin of the plurality of storage bins to at least one weigh hopper of the pluarlity of adjacently arranged weigh hoppers, and wherein each storage bin is in communication with the conveyor mechanism via an inlet chute and a weigh hopper gate.

2. The load out system of claim 1, wherein the conveyor mechanism comprises a feeder configured to convey and mix bulk material.

3. The load out system of claim 2, wherein the feeder comprises an elongate auger gear housed within an elongate trough, wherein the conveyor mechanism is positioned above and along a longitudinal axis of the weigh hopper assembly.

4. The system of claim 3, wherein a top surface of the elongate trough comprises structure defining a plurality of openings, each opening being in communication with one or more of the storage bins via the inlet chute.

5. The load out system of claim 4, wherein a bottom surface of the screw feeder includes structure defining a plurality of weigh hopper gates, each weigh hopper gate being positioned over a corresponding weigh hopper.

6. The load out system of claim 5, wherein each weigh hopper gate comprises a pair of arms configured to open upon actuation to discharge product in the trough into the corresponding weigh hopper.

7. The load out system of claim 1, wherein each weigh hopper is mounted on an independent load cell assembly and comprises a tapered sidewall, a top surface positioned at a top end of the tapered sidewall and having structure defining an opening, and a gate positioned at a bottom end of the tapered sidewall, the weigh hopper being configured to receive and weigh material delivered from the conveyor mechanism and to discharge the material into or onto the transport vehicle via the gate positioned at a bottom end of the tapered sidewall.

8. The system of claim 7, wherein the gate comprises a hydraulic, electric gate, or a pneumatic gate.

9. The system of claim 1, the system further comprising a flush hopper, wherein the flush hopper is mounted to an end of the frame, wherein the flush hopper is configured to discharge a flush product from the conveyor mechanism for cleaning the conveyor mechanism.

10. A method of performing a product load out into a transport vehicle, the method comprising:
    providing a plurality of product bins;
    providing a weigh hopper assembly comprising a plurality of adjacently arranged weigh hoppers;
    providing a system for performing the product load, the system being configured to:
    cause a first product to be discharged from one or more product bins into a conveyor mechanism;
    cause, via the conveyor mechanism, the first product to be conveyed to a first weigh hopper of the plurality of weigh hoppers;
    cause the first product to be discharged into the first weigh hopper;
    cause a second product different from the first product to be discharged from one or more product bins into the conveyor mechanism; cause, via the conveyor mechanism, the second product to be conveyed to a second weigh hopper of the plurality of weigh hoppers; and
    cause the second product to be discharged into the second weigh hopper.

11. The method of claim 10, wherein the transport vehicle includes a plurality of compartments, and wherein the system is configured to:

cause the first product to be discharged from the first weigh hopper into a first compartment of the plurality of compartments; and cause the second product to be discharged from the second weigh hopper into a second compartment of the plurality of compartments.

12. The method of claim 11, the method further comprising:

cleaning the conveyor mechanism between conveying the first product and the second product by:

after causing the discharging of the first product into the first weigh hopper, causing, via the system, a flush product to be discharged into the conveyor mechanism;

causing, via the conveyor mechanism, the flush product to be conveyed to a flush hopper; and causing, via the system, the flush product to be discharged into the flush hopper or into a transport vehicle of like product.

13. The method of claim 11, wherein the first product comprises material from a first product bin and a second product bin blended in the conveyor mechanism.

14. The method of claim 11, wherein the weigh hopper assembly comprises from five to ten weigh hoppers.

15. The method of claim 11, wherein the conveyor mechanism comprises an elongate conveying element in a trough, a bottom of the trough including structure defining a plurality of gates, each gate being aligned over a weigh hopper of the assembly of weigh hoppers.

16. The method of claim 15, wherein causing the first product to be discharged into the first weigh hopper or the second product into the second weigh hopper comprises:

causing, via the system, a gate of the plurality of gates to be actuated, wherein upon actuation, a pair of arms open, allowing the product to be discharged into the corresponding weigh hopper, while the other gates of the plurality of gates remain closed.

17. The method of claim 11, further comprising:

positioning the transport vehicle under the weigh hopper assembly such that each compartment of the compartmentalized transport vehicle is positioned below one weigh hopper;

causing, via the system, the first product from the first weigh hopper to be discharged into a first compartment of the transport vehicle; and causing, via the system, the second product form the second weigh hopper to be discharged into a second compartment of the transport vehicle.

18. The method of claim 11, wherein discharging the first product from the first weigh hopper into the first compartment and discharging the second product form the second weigh hopper into the second compartment is performed simultaneously.

19. The method of claim 11, wherein discharging the first product from the first weigh hopper into the first compartment and discharging the second product form the second weigh hopper into the second compartment is performed sequentially.

* * * * *